United States Patent
Kucera

(10) Patent No.: US 10,630,789 B2
(45) Date of Patent: Apr. 21, 2020

(54) FACILITATING CONSISTENT A/B TESTING ASSIGNMENT

(71) Applicant: Adobe Inc., San Jose, CA (US)

(72) Inventor: John Kucera, San Jose, CA (US)

(73) Assignee: Adobe Inc., San Jose, CA (US)

(*) Notice: Subject to any disclaimer, the term of this patent is extended or adjusted under 35 U.S.C. 154(b) by 164 days.

(21) Appl. No.: 15/209,518

(22) Filed: Jul. 13, 2016

(65) Prior Publication Data
US 2018/0020065 A1    Jan. 18, 2018

(51) Int. Cl.
*H04L 29/08*   (2006.01)
*G06Q 30/02*   (2012.01)

(52) U.S. Cl.
CPC ......... *H04L 67/22* (2013.01); *G06Q 30/0246* (2013.01); *H04L 67/02* (2013.01); *H04L 67/146* (2013.01)

(58) Field of Classification Search
CPC ....................................................... H04L 67/22
See application file for complete search history.

(56) References Cited

U.S. PATENT DOCUMENTS

| | | | |
|---|---|---|---|
| 7,975,000 B2 | 7/2011 | Dixon et al. | |
| 9,329,858 B2* | 5/2016 | Nicol | G06F 11/3664 |
| 9,451,006 B1* | 9/2016 | Miller | H04L 67/42 |
| 2008/0162699 A1* | 7/2008 | Gaffney | H04L 67/02 709/226 |
| 2008/0189156 A1* | 8/2008 | Voda | G06Q 10/063 705/7.33 |
| 2008/0275980 A1* | 11/2008 | Hansen | G06Q 30/02 709/224 |
| 2012/0072279 A1* | 3/2012 | Agarwal | G06F 17/30445 705/14.43 |
| 2013/0030868 A1* | 1/2013 | Lyon | G06Q 30/0236 705/7.33 |
| 2013/0031228 A1* | 1/2013 | Lyon | G06Q 10/06311 709/223 |
| 2014/0032577 A1* | 1/2014 | Trieloff | G06F 17/30 707/756 |
| 2014/0115039 A1* | 4/2014 | Dixon | G06Q 30/02 709/203 |
| 2014/0278747 A1* | 9/2014 | Gumm | G06Q 30/0201 705/7.29 |
| 2015/0186521 A1* | 7/2015 | Yavilevich | G06F 17/30864 707/710 |
| 2015/0248423 A1* | 9/2015 | Christolini | G06F 17/3089 715/202 |
| 2015/0349960 A1* | 12/2015 | Bagley | H04L 9/3242 713/168 |

(Continued)

*Primary Examiner* — Jimmy H Tran
(74) *Attorney, Agent, or Firm* — Keller Jolley Preece

(57) ABSTRACT

The present disclosure is directed toward systems and methods for providing consistent test versions of an A/B tested web page in an A/B test. For example, one or more embodiments described herein generate an A/B test mapping that associates ranges of identifiers with test versions of an A/B tested web page. Additionally, embodiments described herein generate a web page visitor token based on a random number that corresponds to a single identifier within the mapping. Each time the web page visitor requests the A/B tested web page, systems and methods described herein utilize the visitor token to consistently provide the same test version of the A/B tested web page to the web page visitor.

20 Claims, 8 Drawing Sheets

(56) References Cited

U.S. PATENT DOCUMENTS

| | | | |
|---|---|---|---|
| 2015/0363302 A1* | 12/2015 | Young | G06F 11/3688 |
| | | | 717/130 |
| 2016/0062910 A1* | 3/2016 | Van Dyke | G06F 12/1018 |
| | | | 711/126 |
| 2016/0092208 A1* | 3/2016 | Nicol | G06F 11/3664 |
| | | | 717/121 |
| 2016/0124839 A1* | 5/2016 | Mordo | G06F 11/3664 |
| | | | 717/124 |
| 2016/0225063 A1* | 8/2016 | Wical | G06Q 30/0631 |
| 2017/0091077 A1* | 3/2017 | Manion | G06F 11/3668 |
| 2017/0116165 A1* | 4/2017 | Parthiban | G06F 3/0482 |
| 2017/0316123 A1* | 11/2017 | Xu | G06F 17/5009 |

* cited by examiner

FACILITATING CONSISTENT A/B TESTING ASSIGNMENT

BACKGROUND

The success of a website, a digital advertisement, or other online marketing material is generally measured in terms of conversion rates. In order to determine how various web page elements affect a conversion rate associated with the web page, a website manager can creates multiple test versions of the same web page. Then, in order to determine which test version of the web page generates the best conversion rates, the website manager can send website traffic to each web page test version. The best test version of the web page will be the one that leads to the highest number of item purchases.

One way a website manager can test the conversion rates among test versions of a web page is by conducting an "A/B test" (also known as a "Split Test"). An A/B test requires a webserver to randomly assign a single web page visitor to one of many available test versions of a web page and consistently reassign the web page visitor to the same test version of the web page on the visitor's subsequent visits to the website. This is done to ensure that each version is shown the same distribution of visitors to avoid underlying bias in the audience. Later, when the same visitor again requests the web page from the webserver, the webserver will return the same test version of the requested web page. Over time, the webserver gathers conversion data related to the various test versions of the web page in order to determine which test version has the highest conversion rate.

In some cases, in order to consistently return the previously viewed test version of a web page to a website visitor, the webserver utilizes a persistent storage mechanism to maintain a database of web page visitors and associated test versions of a web page in an A/B test. When the web server receives a web page request from the visitor, the web server looks the visitor up in the persistent storage mechanism to determine which test version of the web page to return to the visitor. Persistent storage is problematic when a website is supported by multiple web servers. In that case, the database of web page visitors and associated test versions of the web page is often not correctly mirrored across all web servers leading to frequent mistakes in providing the appropriate test version of a web page to a repeat visitor.

A/B testing is further complicated when a website is hosted across multiple servers and a load-balancer is included to help avoid overloading on any single server. After a visitor is assigned to a version, the information about which version of the web page the visitor should see in subsequent visits is often not replicated across all possible web servers in a timely or reliable fashion. This is problematic when the original server that assigned the version of the web page to the visitor becomes overloaded before propagating visitor information to other servers. In that case, when the visitor returns, the load-balancer may direct the visitor to a less busy server that does not have the correct web page information for that visitor. This is problematic in that a website visitor may not be consistently provided with the same test version of the web page in an A/B test.

Rather than utilizing persistent storage, another method of conducting an A/B test includes utilizing a website visitor's IP address to determine which test version of web page to return to a visitor as part of an A/B test. A webserver can create a hash of the visitor's IP address, or simply utilize a portion of the IP address to determine what version of a web page to show to a visitor. To illustrate, if the A/B test includes two test versions of a web page, the web server may return the first test version of the web page to visitors where a portion of the visitors' IP address is even, and the second test version of the web page to visitors where the same portion of the visitors' IP address is odd.

This method of conducting an A/B test, however, does not lead to truly randomized test results as similar IP addresses are generally distributed on a geographic basis. Accordingly, the final results of the A/B test will not be truly randomized.

SUMMARY

One or more embodiments described herein provide benefits and solve one or more of the foregoing or other problems in the art with systems and methods that consistently and randomly assign website visitors to the correct test version of a web page in an A/B test. For example, the systems and methods described herein utilize tokens stored on client-computing devices that correspond to a mapping of one or more test versions of a web page in order to ensure that a website visitor consistently views the same test version of a web page. In one or more embodiments, systems and methods described herein distribute the mapping to all web servers hosting a website conducting an A/B test on a particular web page. Thus, each time the visitor requests a particular web page for which an A/B test is being conducted, systems and methods described herein consistently assign a previously viewed test version of the web page to the visitor based on the mapping of the visitor's token to a test version of the web page.

One or more embodiments also include systems and methods that generate a token for each first-time website visitor, guaranteeing a truly random assignment of website visitors to a test version of an A/B tested web page. For example, the systems and methods described herein utilize a random number generator to create a visitor token that corresponds to a range within the mapping associated with the A/B test. Accordingly, web page visitors are randomly assigned to various versions of the web page, regardless of their location or any other factor.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1A:
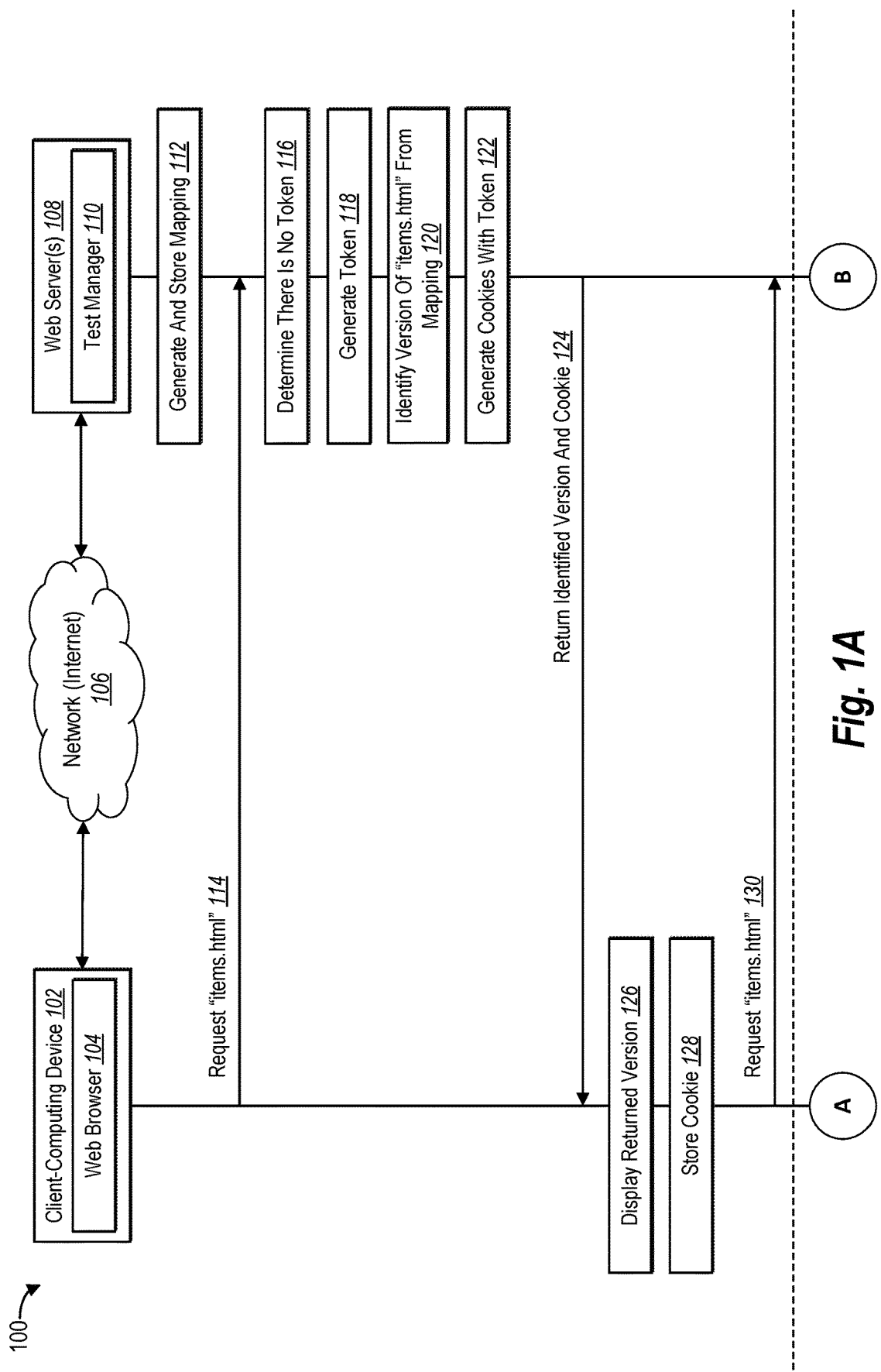
FIGS. 1A and 1B illustrate a sequence diagram of a test management system conducting an A/B test in accordance with one or more embodiments.

One or more embodiments described herein include a test management system that ensures consistent and randomized A/B testing. For example, for a first-time website visitor requesting an A/B tested web page, the test management system generates a token for the visitor. The test management system then returns a test version of the requested web page along with a browser cookie containing the generated token. When the visitor subsequently requests the same web page, the test management system utilizes the visitor's token to return the same test version of the requested web page that the visitor received on his previous visit to the website. In one or more embodiments, the test management system returns the previously viewed test version of the web page by mapping the token to list of mapping identifiers assigned to various test versions of the web page. In at least one embodiment, each generated visitor token corresponds to a mapping identifier.

To illustrate, a manager of an ecommerce website may decide to conduct an A/B test on a web page "items.html," which includes three test versions: "itemsA.html," "itemsB.html," and "itemsC.html." Each test version of "items.html" includes variations of various design elements (e.g., navigation bars, color schemes, link placement, text, images, etc.). Further, for the next one thousand web page visitors, the manager may want to direct 30% of web page traffic to "itemsA.html," 30% of web page traffic to "itemsB.html," and 40% of web page traffic to "itemsC.html."

In one or more embodiments and in response to the parameters defined by the website manager, the test management system generates a mapping. In at least one embodiment, the mapping associates ranges of mapping identifiers to two or more test versions of a web page. For example, in response to the parameters defined above, the test management system generates a mapping that maps mapping identifiers 1-300 to "itemsA.html," mapping identifiers 301-600 to "itemsB.html," and mapping identifiers 601-1000 to "itemsC.html."

Alternatively, the test management system generates a mapping that is independent of the number of visitors to the web page. For example, the mapping can map identifiers 1-3 to "itemsA.html," identifiers 4-6 to "itemsB.html," and identifiers 7-10 to "itemsC.html." Once the test management system has generated the mapping, the test management system distributes the mapping to each web server hosting the web page "items.html." Thus, the test management system overcomes previous A/B testing issues regarding mirroring visitor databases across distributed web servers for a website because the generated mapping for the A/B test are set up when the A/B test is initiated.

With the A/B test set up, the test management system initiates the A/B test upon receiving a website visitor request for the web page "items.html." If the website visitor is requesting "items.html" for the first time, the test management system generates a token for the website visitor based on a random identifier generated for the user. Next, the test management system maps the token to a mapping identifier to determine the range of mapping identifiers within which the generated token falls, and returns the test version of the web page "items.html" that corresponds with that range. For example, if the generated token is 550, the test management system will return "itemsB.html." In one or more embodiments, the test management system returns the identified test version of the requested web page to the website visitor along with a browser cookie containing the generated token.

If the website visitor has previously requested "items.html" during the A/B test, the test management system identifies the visitor's token. For example, in at least one embodiment, the visitor's web page request includes the visitor's token as the visitor's token has been stored on the visitor's client-computing device as a browser cookie. Next, once the test management system receives the request for "items.html" along with the token associated with the visitor, the test management system utilizes the token and the mapping to return the same test version of "items.html" that the website visitor viewed previously. Thus, the test management system ensures that the website visitors sees the same test version of "items.html" for the duration of the A/B test.

In one or more embodiments, the test management system utilizes the same token for additional A/B testing. For example, a website manager may provide additional A/B test parameters for an A/B test on additional web pages within the website. Once the test management system has generated a token for a particular visitor, the test management system can continue to utilize the same token for additional A/B testing on the additional web pages. Thus, the test management system saves time in further A/B testing by recycling the token in subsequent testing.

The test management system 100 is described herein with reference to A/B testing conducted on a web server that serves web pages. One will appreciate that this is done for ease in description. In additional embodiments, the test management system 100 facilitates A/B testing in other types of servers. For example, the test management system 100 facilitates A/B testing on an advertisement server that provides different advertisements. In yet another example, the test management system 100 facilitates A/B testing on a server that provides coupons or sales information. Furthermore, the test management system 100 facilitates A/B testing to compare algorithms for generating web page recommendations.

Furthermore, the test management system 100 is described herein with reference to A/B testing between different versions of a web page. In additional embodiments, the test management system 100 can be utilized in A/B testing between different algorithms for choosing a web page version or generating a web page version. For example, the test management system 100 can manage an A/B test between a first algorithm that selects a test version of a web page, and a second algorithm that personalizes the contents of the web page to a visitor. Thus, using the example above, the test management system 100 can use a first algorithm for choosing what to show visitors on a web page (e.g., such as which products, advertisements, videos) having mapping identifiers of 1-300. The test management system 100 can use a second algorithm for choosing what to show visitors on a web page (e.g., such as which products, advertisements, videos having mapping identifiers 301-600. The test management system 100 can use a third algorithm for choosing what to show visitors on a web page (e.g., such as which products, advertisements, videos having mapping identifiers 601-1000. Thus, as used herein a "test web page" or "test page" refers to one of a plurality of previously generated pages, a page generated on the fly for a particular visitor using one of a plurality of personalization algorithms, or a default web page with one of a plurality of different advertisements or other content items.

One or more of the embodiments described herein illustrate various advantages and computational efficiencies over previously utilized A/B testing schemes. For example, the test management system's use of tokens in A/B testing results in faster processing speeds and less memory usage over previous A/B testing schemes. For instance, the test management system requires no storage of website visitor information or propagation of visitor information across servers, as is common in previously A/B testing schemes.

More specifically, by setting a mapping in advance and providing the mapping to each web server, the test management system can reduce any need to propagate information about A/B tests, new user test page assignment, or new user identifiers around the network. The reduction in network traffic not only enables faster processing, it also ensures that latencies in data propagation do not cause miss-assignment of test pages.

Furthermore, because the tokens are server generated (rather than generated by client devices requesting the webpages), the random number generator used to generate the tokens can be vetted to be truly random. Random assignment of test pages or ads during A/B testing helps ensure that the results of the A/B test are not biased. For example, prior art solutions may use an IP address as an identifier for assignment of test pages or ads. Because IP addresses are geographically based rather than randomly assigned, one of the test pages may be assigned to a group of related IP addresses and thus a single geographic region. Users in the region may have biases or tendencies not common to the entire user base. Thus, any test results based on a test page only be viewed by users in the single geographic region can lead to conclusions that will not hold true with the entire user base.

Figure 1B:
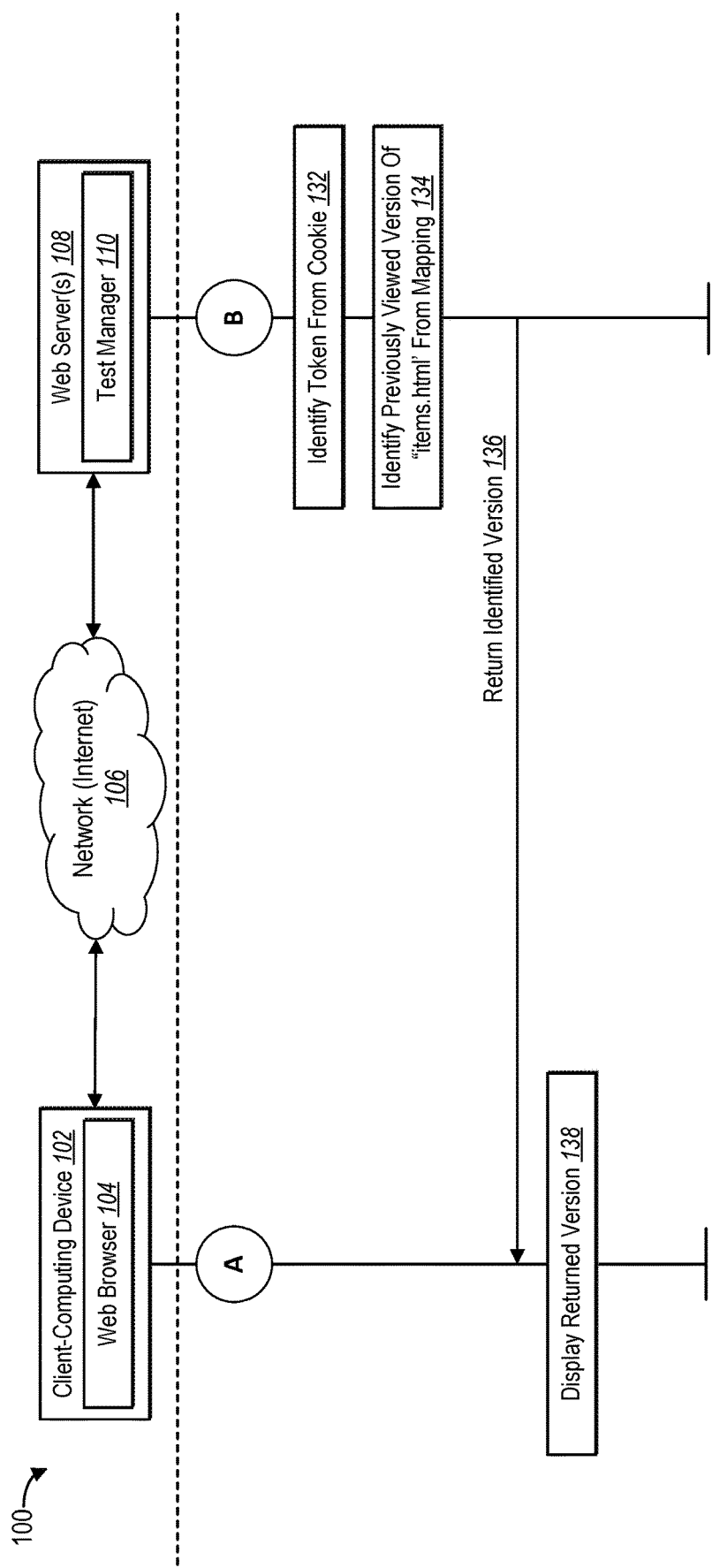

The process by which the test management system 100 ensures consistent and randomized A/B testing will now be described with reference to a sequence diagram illustrated in FIGS. 1A and 1B. FIGS. 1A and 1B illustrate an example embodiment of processes implemented by the test management system 100. In one or more embodiments, the system 100 includes various components for performing the processes and features described herein. For example, as shown in FIGS. 1A and 1B, the system 100 includes but is not limited to, a client-computing device 102, a network 106, and one or more web servers 108. In one or more embodiments, the client-computing device 102 includes a web browser 104, and the one or more web servers 108 include a test manager 110.

In one or more embodiments, as shown in FIG. 1A, the illustrated process begins with the test manager 110 generating and storing a mapping (112). For example, as mentioned above, a website manager may decide to perform an A/B test among three test versions of a web page "items.html" entitled "itemsA.html," "itemsB.html," and "itemsC.html." The website manager can further define the parameters of the A/B test to specify that for the first one thousand web page visitors, 30% of web page visitors will receive "itemsA.html", 30% of web page visitors will receive "itemsB.html," and 40% of web page visitors will receive "itemsC.html." As mentioned above, in at least one embodiment, the website manager may decide to perform an A/B test among different algorithms for choosing or generating a web page, rather than among different versions of a web page. Furthermore, in at least one embodiment, the website manager may perform an A/B test among different algorithms in order to create a recommendation for a web page.

Upon receiving these A/B test parameters, the test manager 110 generates and stores a mapping (112) for the A/B test parameters. In one or more embodiments, the test manager 110 generates a mapping of A/B test parameters by creating a map that associates ranges of mapping identifiers with test versions of a web page. For example, using the parameters laid out above, the test manager 110 can generate a list of any number of mapping identifiers. Next, the test manager 110 can map the first 30% of the number of mapping identifiers to "itemsA.html," the next 30% of the number of mapping identifiers to "itemsB.html," and the last 40% of the number of mapping identifiers to "itemsC.html." Thus, the resulting mapping associates ranges of mapping identifiers to test versions of the web page, "items.html."

After generating a mapping for the A/B test parameters, as shown in FIG. 1A, the test manager 110 stores the mapping (112). In one or more embodiments, the test manager 110 stores the mapping based on the hosting topography of the website where the website manager is conducting the A/B test. For example, in some embodiments, a single web server may host an entire website. In other embodiments, several networked web servers may host a web site. In that case, each networked web server may host all or a portion of the website. Additionally, a website manager may also utilize a load balancer to ensure that no single web server becomes overloaded with web page requests.

In one or more embodiments, if a single web server hosts the entire website, the test manager 110 stores the generated mapping on the single web server. If several networked web servers host the website, the test manager 110 stores the generated mapping on each of the networked web servers. Furthermore, if a load balancer is utilized, the test manager 110 can also store the generated mapping on the load balancer. In additional or alternative embodiments, the test manager 110 can also distribute the generated mapping to web servers in different "data centers" that serve different geographical regions (e.g., in order to maintain a web site if an entire data center goes offline or in case a visitor travels to a different geographic location, etc.). By storing the generated mapping on each of the one or more web servers hosting the website, the test manager 110 eliminates the need to constantly update mirrored visitor databases.

Next, once the mapping of the A/B test parameters is in place, the client-computing device 102 requests the A/B tested web page "items.html" (114). In one or more embodiments, the client-computing device 102 requests the web page via the web browser 104. In response to receiving the web page request for "items.html" (114), the test manager 110 determines whether there is a token (116) associated with the client-computing device 102. As will be described in more detail below, if the user of the client-computing device 102 has previously requested a web page for which the test manager 110 is conducting an A/B test, the web browser 104 will provide a token along with the request for the web page. Thus, in one or more embodiments, the test manager 110 determines there is no token 116 associated with the client-computing device 102 when the web browser 104 does not include a token with the request for the A/B tested web page.

In response to determining that there is no token (116) associated with the client-computing device 102, the test manager 110 generates a random token (118) for the client-computing device. Thus, the first time a user of the client-computing device 102 requests the web page, the test manager 110 utilizes a random number generator to generate a token for the user of the client-computing device 102. The token then maps to, is one of, or comprises one of the mapping identifiers.

To illustrate, in one or more embodiments and in order to generate a token for a first-time visitor, the test manager 110 provides a random number generator with the appropriate range of mapping identifiers. The random number generator then outputs a token that is within the range of mapping identifiers. For example, using the A/B test parameters laid out above, the random number generator outputs a token that is within the range of 1 to 1000, inclusive. In one or more embodiments, the random number generator is a computational utility that outputs a sequence of numbers that are random. In at least one embodiment, the random number generator outputs sequences of random numbers based on an algorithm (e.g., the Linear Congruential Generator, the Mersenne Twister, etc.) that utilizes a fixed value or "seed." More specifically, the random generator can generate a random number of a certain length. For example, the random generator can generate a number having 12 digits.

Once the test manager 110 has generated a token associated with the client-computing device 102, the test manager 110 next identifies a test version of the requested web page that corresponds with generated token in the mapping (120). As described above, the mapping associates ranges of mapping identifiers to test versions of an A/B tested web page. For example, in the case of random twelve digit numbers. The mapping can establish that a certain number of the twelve digits will be used for a particular A/B test, such as the last 3 digits, will be used as mapping identifiers. Based on the number of test pages and desired percentages of user to see each test page, the mapping can link ranges of mapping identifiers to test pages. For example, the mapping can indicate that mapping identifiers from 000 to 249 will be shown a first test page, mapping identifiers from 250 to 499 will be shown a second test page, mapping identifiers from 500-749 will be shown a third test page, and mapping identifiers from 750-999 will be shown a fourth test page. Accordingly, in one or more embodiments, the test manager 110 identifies the appropriate test version of the requested web page (120) by determining which mapping identifier in the mapping is associated with the generated token, and identifying the test version in the mapping that corresponds with that mapping identifier.

Additionally, in order to return the generated token to the client-computing device 102, the test manager 110 generates a browser cookie containing the token. In one or more embodiments, the test manager 110 generates the browser cookie as a text file that includes the generated token. In additional or alternative embodiments, the test manager 110 can include additional information in the generated browser cookie. For example, the test manager 110 can include the uniform resource locator for the requested web page, the date and time, and so forth.

Next, the test manager 110 returns the identified test version of the web page and the generated cookie (124) to the client-computing device 102. In one or more embodiments, the web browser 104 displays the test version of the web page (126) and stores the generated cookie (128). For example, using the A/B test parameters described above, if the user of the client-computing device 102 requests "items.html" for the first time after the A/B test begins, the test manager 110 generates a token associated with the client-computing device 102, identifies a test version of "items.html" (e.g., "itemsA.html," "itemsB.html," "itemsC.html") associated with the token in the mapping for the A/B test. The test manager 110 generates a cookie including the token and returns the test version of "items.html" and the generated cookie to the client-computing device 102.

In one or more embodiments, from the perspective of the user of the client-computing device 102, there is no indication that the test version of the requested web page is not the requested web page. Additionally, there is no indication at the client-computing device 102 that the test manager 110 has returned a browser cookie. Thus, in one or more embodiments, the user of the client-computing device 102 is unaware of participation in an A/B test.

At a later point in time, after the user of the client-computing device 102 has requested the A/B tested web page at least once, the user of the client-computing device 102 again requests the same A/B tested web page (130) via the web browser 104. In one or more embodiments, the web browser 104 includes the previously stored browser cookie received from the test manager 110 with the request for the A/B tested web page (130). In at least one embodiment, the web browser 104 includes browser cookies in web page requests in response to determining that a browser cookie exists in the client-computing device's storage that corresponds with a web page that the user of the client-computing device 102 is requesting via the web browser 104.

As illustrated in FIGS. 1B and 1n response to receiving the web page request for the A/B tested web page (130), the test manager 110 identifies a token associated with the client-computing device 102 from the browser cookie included in the web page request (132). As discussed above, in at least one embodiment, the test manager 110 determines that a client-computing device 102 has previously requested an A/B tested web page based on whether the web page request includes a browser cookie. If the web page request does not include a browser cookie, the test manager 110 generates a token for the client-computing device 102, as described above. If the web page request includes a browser cookie, the test manager 110 identifies the token from the browser cookie (132).

Once the test manager 110 has identified the token from the browser cookie (132), the test manager 110 identifies the previously viewed version of the requested web page from the mapping for the A/B test (134). For example, as described above, the mapping for the A/B test associates ranges of mapping identifiers to versions of the A/B tested web page. Accordingly, in one or more embodiments, the test manager 110 identifies the previously viewed version of the requested web page by determining the which mapping identifier is associated with the token from the client-computing device 102. The test manager 110 then identifies the web page test version that corresponds with that mapping identifier within the mapping for the A/B test.

Finally, in one or more embodiments, upon identifying the previously viewed test version of the requested web page from the A/B test mapping (134), the test manager 110 returns the identified test version of the A/B tested web page (136) to the client-computing device 102. The web browser 104 then displays the returned test version (138). Thus, the user of the client-computing device 102 consistently sees the same test version of the web page for the duration of the A/B test.

As discussed above, the test management system described with reference to FIGS. 1A and 1B ensures that a web page visitor is appropriately provided a randomized web page test version upon first visiting the web page, and is then consistently provided with the same web page test version in subsequent visits to the web page. Accordingly, over time the test management system provides an accurate picture of which test version of the A/B tested web pages.

Furthermore, in additional embodiments, the test management system can reuse the generated token in additional A/B testing. For example, the website manager may submit A/B testing parameters for testing of an additional web page within the website upon completion of A/B testing on an initial web page within the website. In one or more embodiments, the test management system can reuse a token from an initial A/B test if the test management system generates a subsequent A/B test mapping in the same manner as the initial A/B test mapping. As discussed above, the test management system generates a token such that the token corresponds with a single mapping identifier within the mapping for a given A/B test.

More specifically, because the token may include a random number, such as a number with twelve digits, a new mapping for a new campaign can use more, less, or different digits. For example, rather than using the last three digits, the new mapping can use the first three or digits 4-6, etc. One will appreciate that the ability to use the same token for multiple different campaigns can reduce the need to update cookies or propagate data around the network of servers.

Figure 2:
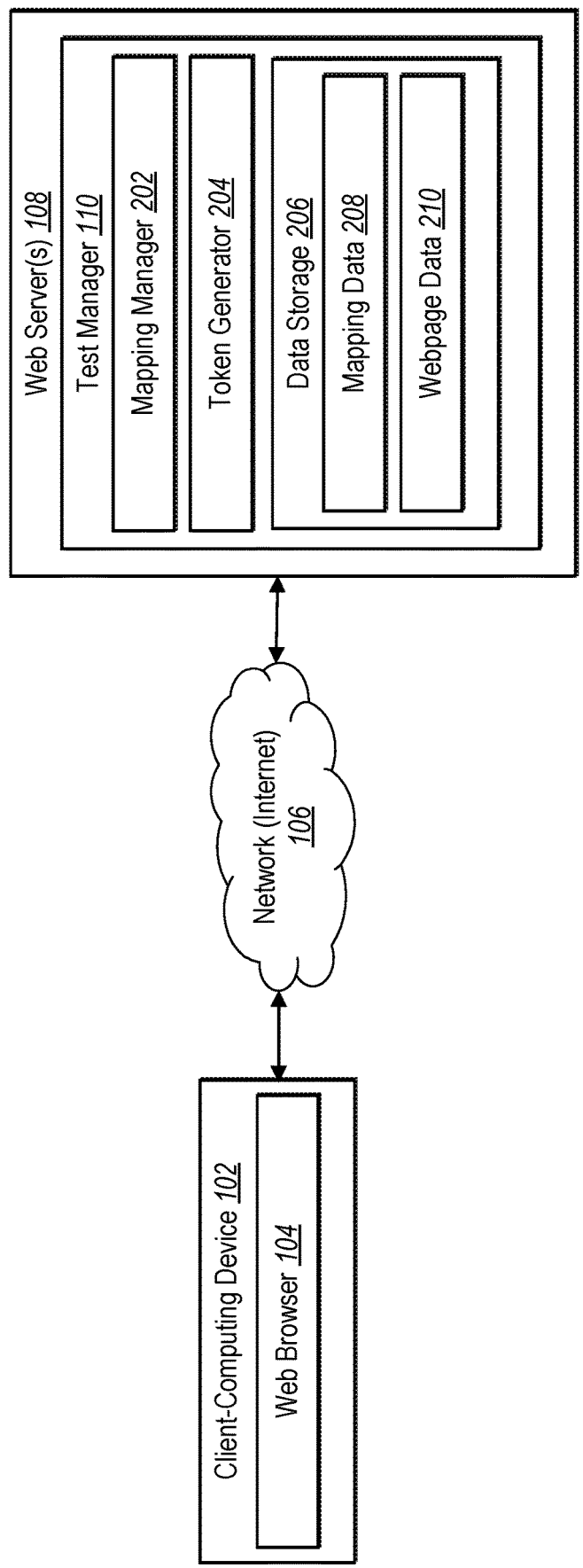
FIG. 2 illustrates a schematic diagram of an example architecture of a test management system in accordance with one or more embodiments.

FIGS. 1A and 1B and their related descriptions detail the functions and features of the test management system 100 with regard to a sequence diagram. FIG. 2 illustrates an example architecture for the test management system 100. As discussed above, the test management system 100 enables consistent and randomized AB testing among test versions of a web page in order to identify a test version of the web page. As shown in FIG. 2, the test management system 100 includes a test manager 110 installed on a web server 108. The test manager 110 includes, but is not limited to, a mapping manager 202, a token generator 204, and data storage 206 including mapping data 208 and web page data 210. The test management system 100 also includes a client-computing device 102 running a web browser 104.

Although the disclosure herein shows the components 202-206 to be separate in FIG. 2, any of the components 202-206 may be combined into fewer components, such as into a single facility or module, or divided into more components as may serve one or more embodiments. In addition, the components 202-206 may be located on, or implemented by, one or more computing devices, such as those described below in relation to FIG. 6.

In one or more embodiments, the components 202-206 comprise software, hardware, or both. For example, the components 202-206 can comprise computing instruction stored on a non-transitory computer-readable storage medium and executable by at least one processor of the client-computing device 102. When executed by the at least one processor, the computer-executable instructions cause the client-computing device 102 to perform the methods and processes described herein. Alternatively, the components 202-206 can comprise hardware, such as a special purpose processing device to perform a certain function or group of functions. Additionally, the components 202-206 can comprise a combination of computer-executable instructions and hardware.

In at least one embodiment, the client-computing device 102 is associated with a user who is browsing the Internet on the web browser 104. In one or more embodiments, the web browser 104 is a native application installed on the client-computing device 102. Furthermore, in one or more embodiments, the client-computing device 102 is any type of computing device (e.g., a desktop or a laptop) including, but not limited to, a handheld device such as a tablet, a smart phone, a personal digital assistant, a smart wearable (e.g., a smart watch or enhanced eyewear), etc.

Additionally, in one or more embodiments, the client-computing device 102 and the web server(s) 108 communicate through the network 106. In one or more embodiments, the network 106 includes the Internet or World Wide Web. The network 106, however, can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. The network 106 is further described with reference to FIG. 6 below.

Also shown in FIG. 2, the web server 108 includes the test manager 110. In one or more embodiments, the web server 108 functions for a variety of purposes. For example, one or more embodiments described herein utilize the web server 108 for hosting and serving data representative of one or more web pages within a website. In additional or alternative embodiments, the web server 108 can also function as a file server or other type of data server. In one or more embodiments, the web server 108 is representative of a network of servers interconnected for the purpose of supporting a website. For example, in at least one embodiment, the test management system 100 includes multiple networked servers that collectively host a single website. In that case, each networked server may host all or a portion of the website. A load balancer may be employed to ensure that no one server receives an excessive number of web page requests.

As shown in FIG. 2, the test manager 110 includes a mapping manager 202. As discussed above with reference to FIG. 1A, a website manager can provide the test manager 110 with A/B test parameters. Accordingly, in one or more embodiments and in response to the test manager 110 receiving the A/B test parameters, the mapping manager 202 generates a mapping for the A/B test based on the received parameters. In at least one embodiment, the A/B test parameters include a listing of test versions of an A/B tested web page (e.g., "itemsA.html," "itemsB.html," "itemsC.html"), a desired distribution of web page traffic to each test version of the A/B tested web page (e.g., 30% of web page visitors to "itemsA.html," 30% of web page visitors to "itemsB.html," 40% of web page visitors to "itemsC.html"). Alternatively, rather than mapping to web pages, the mapping associates mapping identifiers or ranges of mapping identifiers to different personalization algorithms. As used herein, a personalization algorithm is an algorithm that takes user information (e.g., demographic information (age, gender, etc.), location information, user profile information, purchase history, browsing history) as input and selects one or more website features (advertisements, videos, images, different products to include on landing page, etc.) based on the user information. Furthermore, in another alternative embodiment, the mapping can be used to test algorithms that create different sets of recommended items.

In at least one embodiment, the A/B test parameters can also include an audience size (e.g., one thousand first-time web page requests) to determine when to stop the test. In additional or alternative embodiments, rather than including a defined audience size, the A/B test parameters can include a testing time window (e.g., the A/B test will run from 12:00 pm on May 17, 2016 to 12:00 pm on May 18, 2016, or the A/B test will run for 24 hours starting 12:00 pm on May 17, 2016). In alternative embodiments, the test manager may let the test run until receiving input to stop the test (e.g., there is no predefined stopping criteria like a number of visitors or date range).

In one or more embodiments, the mapping manager 202 receives A/B test parameters via a one or more user interfaces. For example, the website manager provides A/B test parameters via one or more user interfaces presented on a display of the web server 108, or on the display of another terminal communicatively connected to the web server 108. In additional or alternative embodiments, the mapping manager 202 receives A/B test parameters via a spreadsheet, a comma separated file, a command line prompt, etc.

With the A/B test parameters defined, the mapping manager 202 generates a mapping for the A/B test by associating the test versions of the A/B tested web page with ranges of mapping identifiers. In one or more embodiments, the mapping identifiers include a sequential list of integers (e.g., 1, 2, 3, 4, 5, etc.). In alternative embodiments, a mapping identifier can be a non-integer (e.g., a decimal), a character (e.g., a letter), a string of characters, a mix of numbers and characters, and so forth.

Next, the mapping manager 202 associates ranges of mapping identifiers with each of the test versions of the A/B tested web page or personalization algorithm based on the desired distribution of web page traffic to each test version of the A/B tested web page. For example, if the desired distribution of web page traffic specifies that 30% of web page visitors to "itemsA.html" or personalization algorithm A, the mapping manager 202 will associate 30% of the mapping identifiers with "itemsA.html" or personalization algorithm A in the mapping for the A/B test. In one or more embodiments, the mapping manager 202 associates a block of mapping identifiers with a particular test version or personalization algorithm (e.g., identifiers 1-300 assigned to "itemsA.html"). In additional or alternative embodiments, the mapping manager 202 associates mapping identifiers with the particular test version or personalization algorithm in a non-contiguous or random manner until the correct percentage of mapping identifiers have been associated with the particular test version.

Thus, the resulting mapping for the A/B test includes a list of mapping identifiers, where each mapping identifier is associated with particular test version of the A/B tested web page, a particular personalization algorithm, or recommendation algorithm being tested. In one or more embodiments, the mapping manager 202 generates the mapping as a simple comma separated list. Further, the mapping manager 202 generates the mapping as a relational database, a spreadsheet, or as another type of data storage mechanism. In at least one embodiment, the mapping manager 202 generates the mapping as a simple list of mapping identifiers wherein a portion of each mapping identifier is associated with a test version of the web page or each personalization algorithm. Optionally, just the percentages for each variation can be specified to some number of significant digits and the mapping manager can decide how much of the random identifier to use. For example, if the percentages are specified to single-digit percentages the random identifier needs to only support 100 different values.

In addition to generating the mapping for an A/B test, the mapping manager 202 also identifies a test version of an A/B tested web page in response to receiving a token from a client-computing device 102. As discussed above, if a user of the client-computing device 102 has previously requested an A/B tested web page, the web browser 104 will provide the client-computing device's token along with subsequent requests for the A/B tested web page. Accordingly, in response to receiving the token from the client-computing device 102, the mapping manager 202 identifies the mapping identifier within the mapping that corresponds with the received token. For example, in one or more embodiments, the received token matches a mapping identifier within the mapping (e.g., the token and the identifier within the mapping both consist of a single integer). In other embodiments, the mapping manager 202 performs a calculation utilizing the token in order to determine a corresponding mapping identifier within the mapping. For example, the mapping identifier may be a hash of the token or vice versa. Alternatively, the mapping identifier may be a subset of the digits in the token. For example, the mapping identifier may be the first 3 digits, the last three digits, or a random number of digits of the token.

Once the mapping manager 202 identifies the mapping identifier within the mapping that corresponds with the received token, the mapping manager 202 identifies the test version of the A/B tested web page that corresponds with the mapping identifier. For example, in one or more embodiments and depending on the format of the A/B test mapping, the mapping manager 202 identifies the corresponding test version of the A/B tested web page by performing a database lookup utilizing the mapping identifier, by parsing a comma separated file based on the mapping identifier, etc. After the mapping manager 202 identifies the corresponding test version of the A/B tested web page, the test manager 110, via the web server 108, returns the identified test version. In this way, the user of the client-computing device 102 always sees the same test version of the A/B tested web page, or a test page generated using the same personalization algorithm, or a test page generated by the same recommendation algorithm.

Additionally, in one or more embodiments, the mapping manager 202 distributes the generated A/B test mapping to additional networked web servers. As mentioned above, in some embodiments, multiple networked web servers host a single website. In that case, the mapping manager 202 distributes the generated A/B test mapping to all networked web servers.

As shown in FIG. 2, the test manager 110 also includes the token generator 204. As discussed above with reference to FIG. 1A, in response to determining that the client-computing device 102 is requesting an A/B tested web page for the first time, the test manager 110 generates a token for the client-computing device 102. Thus, in at least one embodiment, the token generator 204 begins the process of generating a token for the client-computing device 102 by utilizing a random number generator to generate a random number. For example, in one or more embodiments, the token generator 204 utilizes a random number generator that outputs sequences of random numbers based on a "seeded" algorithm. The token generator 204 can then use at least a portion of the random number as the token. For example, the token can comprise the entire random number or a portion thereof.

In one or more embodiments, the token generator 204 generates tokens in a manner that corresponds to how the mapping manager 202 generates the A/B test mapping. For example, in at least one embodiment, the token generator 204 generates a token such that the token corresponds to a single mapping identifier within the generated A/B test mapping. To illustrate, in one case, the mapping manager 202 generates the A/B test mapping with mapping identifiers that are a sequential list of integers. In that case, the token generator 204 generates a token that is a random integer (or a portion of the random integer) that can be found in the sequential list of integer identifiers in the A/B test mapping. Thus, the token matches a mapping identifier within the A/B test mapping. In additional or alternative embodiments, rather than generating a token that directly matches a mapping identifier within the A/B test mapping, the token generator 204 generates a token that corresponds to a mapping identifier after being input into an equation, algorithm, or hashing function.

In one embodiment, the token generator 204 generates a user's token based on various types of input. For example, the client-computing device 102 can include additional information with a request for a web page (e.g., information including account information, a global identifier previously provided by the web server 108, a visitor identifier). In that case, the token generator 204 can generate the token by utilizing the input. For example, the token generator 204 can perform a hash of a user identifier (e.g., a GUID or visitor ID). In one embodiment, the hash output matches a mapping identifier within the A/B test mapping. In an alternative embodiment, a subset of the hash output (e.g., a number of randomly selected digits from the hash output) matches a mapping identifier within the A/B test mapping. Thus, despite being based on a user identifier, the token can be random.

Regardless of how a token corresponds to a mapping identifier within the A/B test mapping, the token generator 204 generates the token based on a random number. In some embodiments, the token generator 204 utilizes a random number generator to generate a number within a range specified by the token generator 204. For example, in at least one embodiment, the token generator 204 specifies the range to be the same as the range of mapping identifiers found in the mapping for the A/B test. To illustrate, if the mapping includes a range of integer identifiers from one to one-thousand, the random number generator can output a random number in between one and one-thousand. In that case, the token generator 204 can simply generate a token for the client-computing device 102 that matches the generated random number.

In other embodiments, the random number generator may generate a random number that is a non-integer between zero and one. In that case, the token generator 204 can utilize the randomly generated non-integer to generate the token for the client-computing device 102. For example, in one or more embodiments, the token generator 204 utilizes the randomly generated non-integer to generate a token that is within the range of mapping identifiers found in the mapping for the A/B test by utilizing the random non-integer in an algorithm, equation, hash, etc. In additional or alternative embodiments, the token generator 204 generates the token by utilizing a portion of the randomly generated non-integer (e.g., if the randomly generated non-integer is "0.35236," the token generator 204 may use the last three digits to generate a token "236").

In one or more embodiments, the test manager 110 returns the generated token to the client-computing device 102 in the format of a browser cookie. As discussed above, a browser cookie is typically a file containing numbers and/or text. As such, the token generator 204 can package the generated token into a browser cookie by converting the generated token into text and copying the text into a file (e.g., a ".txt" file or similar).

In some embodiments, the token generator 204 also distributes a browser cookie containing the generated token to additional devices and/or cloud-based storage. For example, in at least one embodiment, the website including the A/B tested web page may require a user to have an account with a login and password. Accordingly, the user may log into the website and request the A/B tested web page from any client-computing device (e.g., a laptop, smart phone, tablet, etc.). In that case, the token generator 204 may store the browser cookie someplace other than the client-computing device 102 such that the browser cookie is available to the test manager 110 each time the user logs into the website and requests the A/B tested web page, regardless of the device from which the user makes the request.

Figure 3:
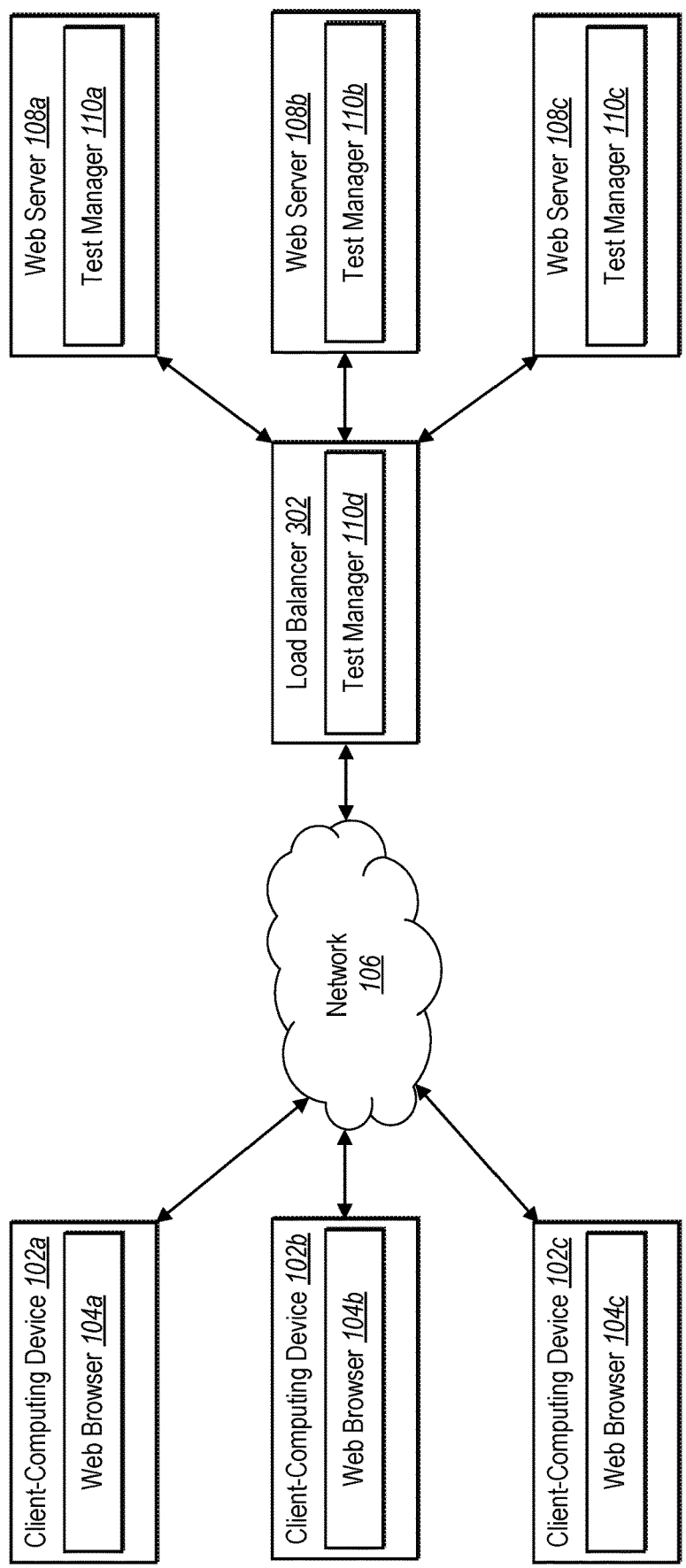
FIG. 3 illustrates a schematic diagram of another example architecture of a test management system in accordance with one or more embodiments.

FIG. 3 illustrates another example architecture for the test management system 100 wherein the test manager is installed on a load balancer. As mentioned above, in some embodiments, a website is hosted across multiple web servers that are managed by a load balancer. Accordingly, in FIG. 3, the load balancer 302 routes all incoming web page requests from the web browsers 104a-104c on the client-computing devices 102a-102c to one of the web servers 108a-108c, depending on how much web traffic each of the web servers 108a-108c can handle. In one or more embodiments, each of the web servers 108a-108c will function less optimally in response to receiving too many web page requests. Accordingly, the load balancer 302 functions to ensure that no one web server 108a-108c becomes overburdened.

In one or more embodiments, as shown in FIG. 3, the load balancer 302 can include the test manager 110d. In this configuration, if a web page request is coming from a first-time web page visitor, the test manager 110d can route the first-time visitor to one of the web servers 108a-108c based on the current loads of the web servers 108a-108c. The test manager 110d can further generate a token for the first-time web page visitor in the manner described above. If the web page request is coming from a web page visitor who has previously visited the web page, the test manager 110d can route the visitor to the same web server that previously responded to the visitor based on the web page visitor's token.

Figure 4:
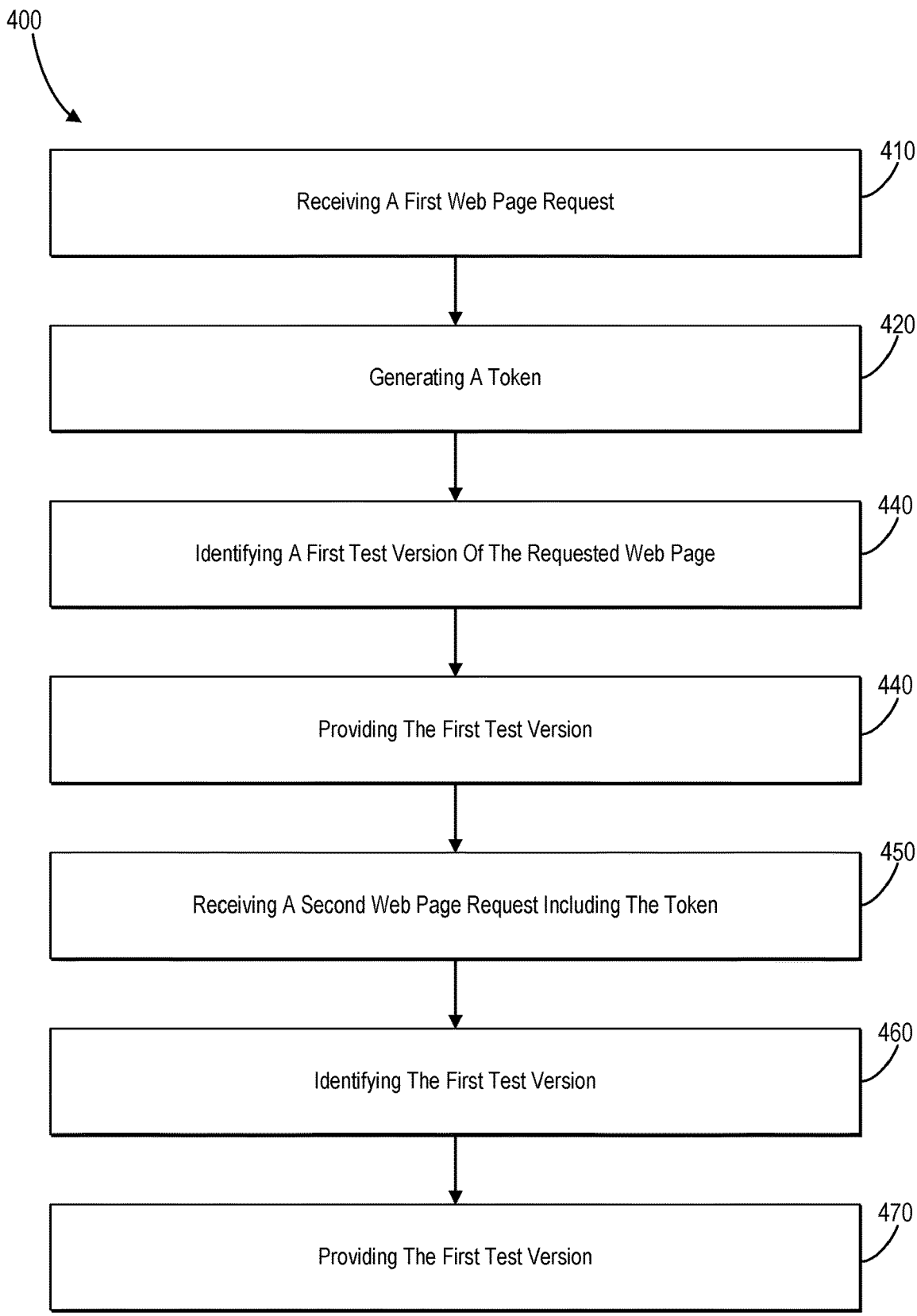
FIG. 4 illustrates a flowchart of a series of acts in a method of conducting an A/B test in accordance with one or more embodiments.

FIGS. 1A-3, the corresponding text, and the examples provide a number of different methods, systems, and devices for conducting A/B testing. In addition to the foregoing, embodiments can also be described in terms of flowcharts comprising acts and steps in a method for accomplishing a particular result. For example, FIG. 4 illustrates a flowchart of acts and steps in a method of conducting an A/B test. One will appreciate in light of the disclosure herein that the method may be performed with less or more steps or acts or the steps or acts may be performed in differing orders. Additionally, the steps or acts described herein may be repeated or performed in parallel with one another or in parallel with different instances of the same or similar steps or acts.

FIG. 4 illustrates a flowchart of one example method 400 of conducting an A/B test. The method 400 includes an act 410 of receiving a first web page request. For example, the act 410 can involve receiving, at a web server and from a client-computing device, a first request for a web page.

The method 400 further includes an act 420 of generating a token. For example, the act 420 can involve generating, by the web server and using a random number generator, a token for the client-computing device. In one or more embodiments, generating a token for the client-computing device includes receiving, from the random number generator, a random number, and generating the token for the client-computing device based on the random number and A/B test parameters.

In some embodiments, the method 400 also includes generating a mapping for an A/B test. In one or more embodiments, generating a mapping for an A/B test includes receiving A/B test parameters, and generating, utilizing the received A/B test parameters, an A/B test mapping. In at least one embodiment, receiving A/B test parameters includes receiving a listing of the plurality of test versions, a desired distribution of web page traffic to each of the plurality of test versions, and an audience size. For example, in at least one embodiment, generating the A/B test mapping includes generating a plurality of mapping identifiers based on the audience size, and associating each of the plurality of mapping identifiers to one of the plurality of test versions based on the desired distribution of web page traffic.

Additionally, the method 400 includes an act 430 of identifying a first test version of the requested web page. For example, the act 430 can involve identifying, based on the generated token for the client-computing device, a first test version of a plurality of test versions of the requested web page. In one or more embodiments, identifying the first test version of the plurality of test versions of the requested web page includes identifying, within the A/B test mapping, a mapping identifier from the plurality of mapping identifiers corresponding to the generated token, and identifying a test version from the plurality of test versions associated with the mapping identifier.

The method 400 also includes an act 440 of providing the first test version. For example, the act 440 can involve providing the first test version of the requested web page and the generated token to the client-computing device. In one or more embodiments, providing the first test version of the requested web page and the generated token to the client-computing device includes generating a browser cookie based on the generated token.

Furthermore, the method 400 includes an act 450 of receiving a second web page request including the token. For example, the act 450 can involve receiving, at the web server and from the client-computing device, a second request for the web page, wherein the second request comprises the token. In one or more embodiments, the second request for the web page is received during the A/B test during which the first request for the web page was received.

The method 400 also includes an act 460 of identifying the first test version. For example, the act 460 can involve identifying the first test version of the requested web page based on the token. In one or more embodiments, identifying the first test version of the requested web page includes identifying a mapping identifier within an A/B test mapping that corresponds with the token, an identifying a test version that is associated with the mapping identifier. Finally, the method 400 includes an act 470 of providing the first test version. For example, the act 470 can involve providing, to the client-computing device, the first test version of the requested web page.

Figure 5:
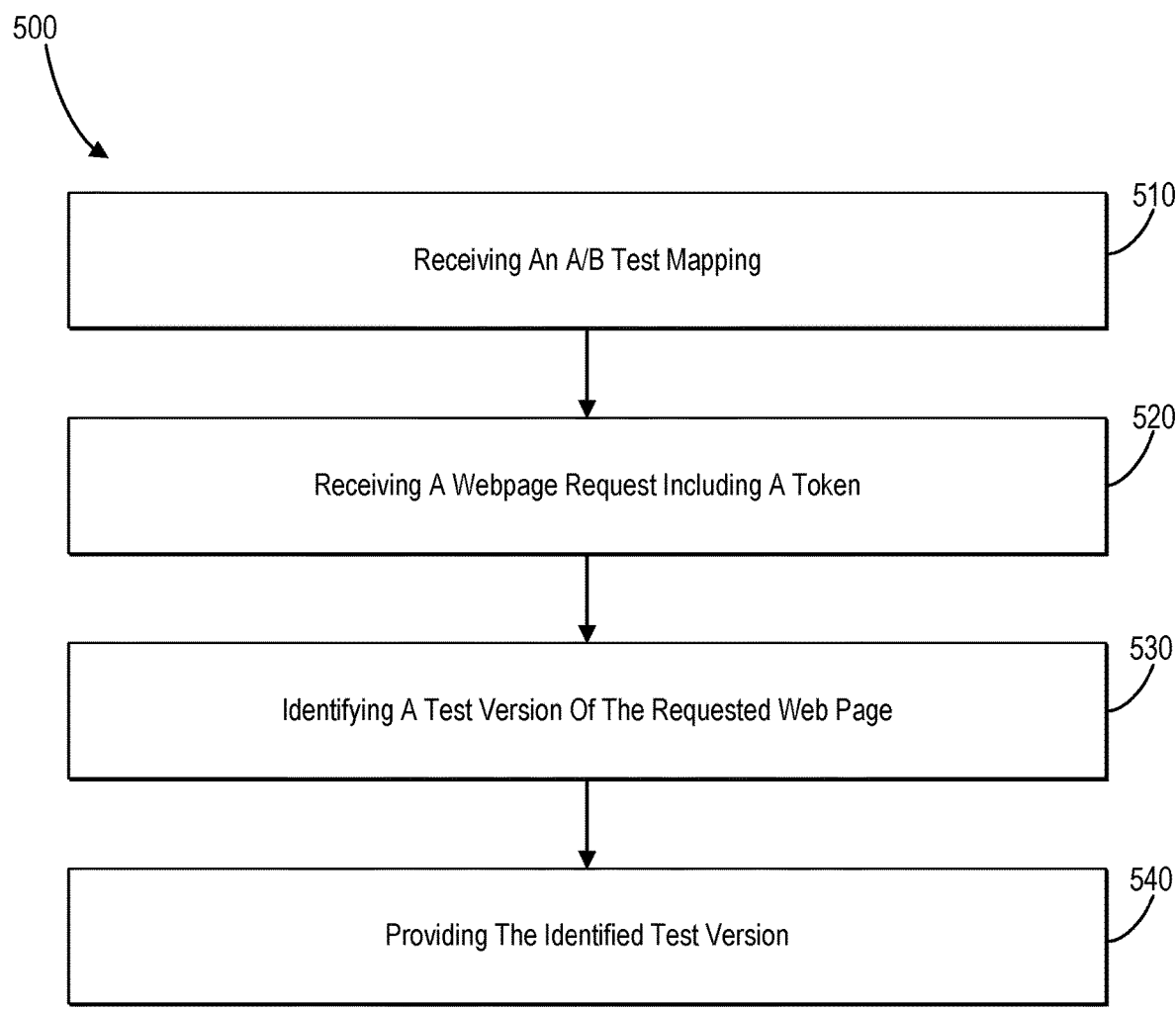
FIG. 5 illustrates a flowchart of a series of acts in another method of conducting an A/B test in accordance with one or more embodiments.

FIG. 5 illustrates a flowchart of another example method 500 of conducting an A/B test. The method 500 includes an act 510 of receiving an A/B test mapping. For example, the act 510 can involve receiving, at a first web server, an A/B test mapping of one or more ranges of mapping identifiers associated with one or more test versions of a first A/B tested web page. In at least one embodiment, the method 500 further includes steps of identifying, prior to receiving the first web page request from the client-computing device, a plurality of additional web servers sharing a common network with the first web server, distributing the received A/B test mapping to the additional web servers, wherein receiving the first web page request is at one of the plurality of additional web servers. Additionally, in some embodiments, identifying one of the one or more test versions of the first A/B tested web page further includes identifying one of the plurality of additional web servers hosting the one of the one or more test versions of the first A/B tested web page, and providing the identified test version of the first A/B tested web page is via the identified additional web server.

The method 500 also includes an act 520 of receiving a webpage request including a token. For example, the act 520 can involve receiving a first web page request from a client-computing device for the first A/B tested web page, wherein the first web page request is for the first A/B tested web page and comprises a token associated with the client-computing device. In at least one embodiment, the token is packaged within a browser cookie.

Additionally, the method 500 includes an act 530 of identifying a test version of the requested web page. For example, the act 530 can involve identifying, within the A/B test mapping and based on the token, one of the one or more test versions of the first A/B tested web page. In one or more embodiments, identifying one of the one or more test versions of the first A/B tested web page includes identifying a mapping identifier within the A/B test mapping corresponding to the token, and identifying a test version of the first A/B tested web page associated with the mapping identifier. In at least one embodiment, identifying a mapping identifier within the A/B test mapping corresponding to the token includes identifying a mapping identifier within the A/B test mapping that matches the token. Alternatively, identifying a mapping identifier within the A/B test mapping corresponding to the token can include creating a hash of the token, and identifying the mapping identifier within the A/B test mapping based on the hash.

Furthermore, the method 500 includes an act 540 of providing the identified test version. For example, the act 540 can involve providing the identified test version of the first A/B tested web page to the client-computing device. Additionally, in some embodiments, the method 500 can include receiving a subsequent A/B test mapping for a second A/B tested web page, receiving a second web page request from the client-computing device for the second A/B tested web page, wherein the second web page request is for the second A/B tested web page and comprises the token associated with the client-computing device, identifying, within the subsequent A/B test mapping and based on the token, a test version of the second A/B tested web page, and providing the identified test version of the second A/B tested web page to the client-computing device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
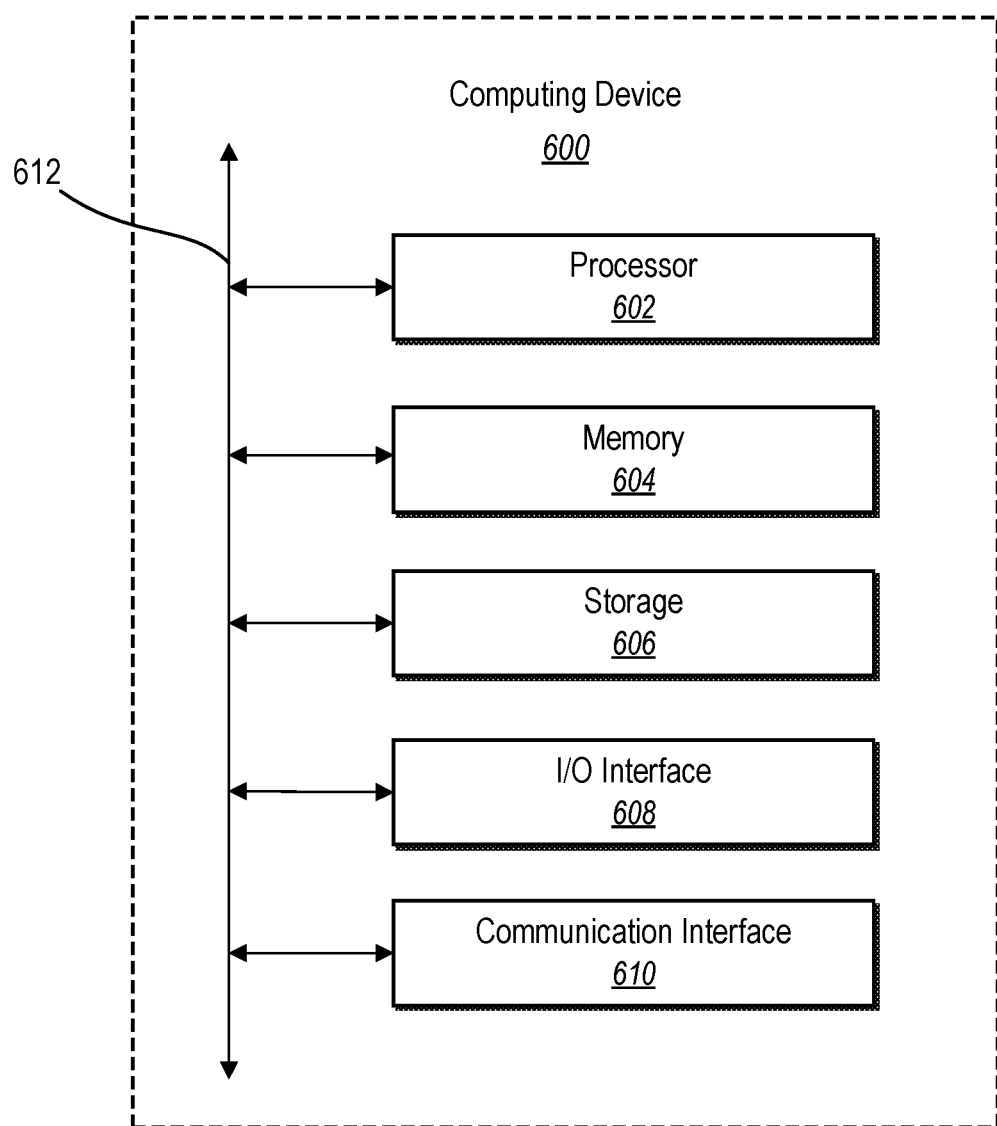
FIG. 6 illustrates a block diagram of an exemplary computing device in accordance with one or more embodiments.

FIG. 6 illustrates a block diagram of an exemplary computing device 600 that may be configured to perform one or more of the processes described above. One will appreciate that one or more computing devices such as the computing device 600 may implement the test management system. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments.

Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. Additionally, the communication interface 610 may facilitate communications via various communication protocols. The communication infrastructure 612 may include hardware, software, or both, that couples components of the computing device 600 to each other. As an example and not by way of limitation, the communication infrastructure 612 may include one or more buses.

Figure 7:
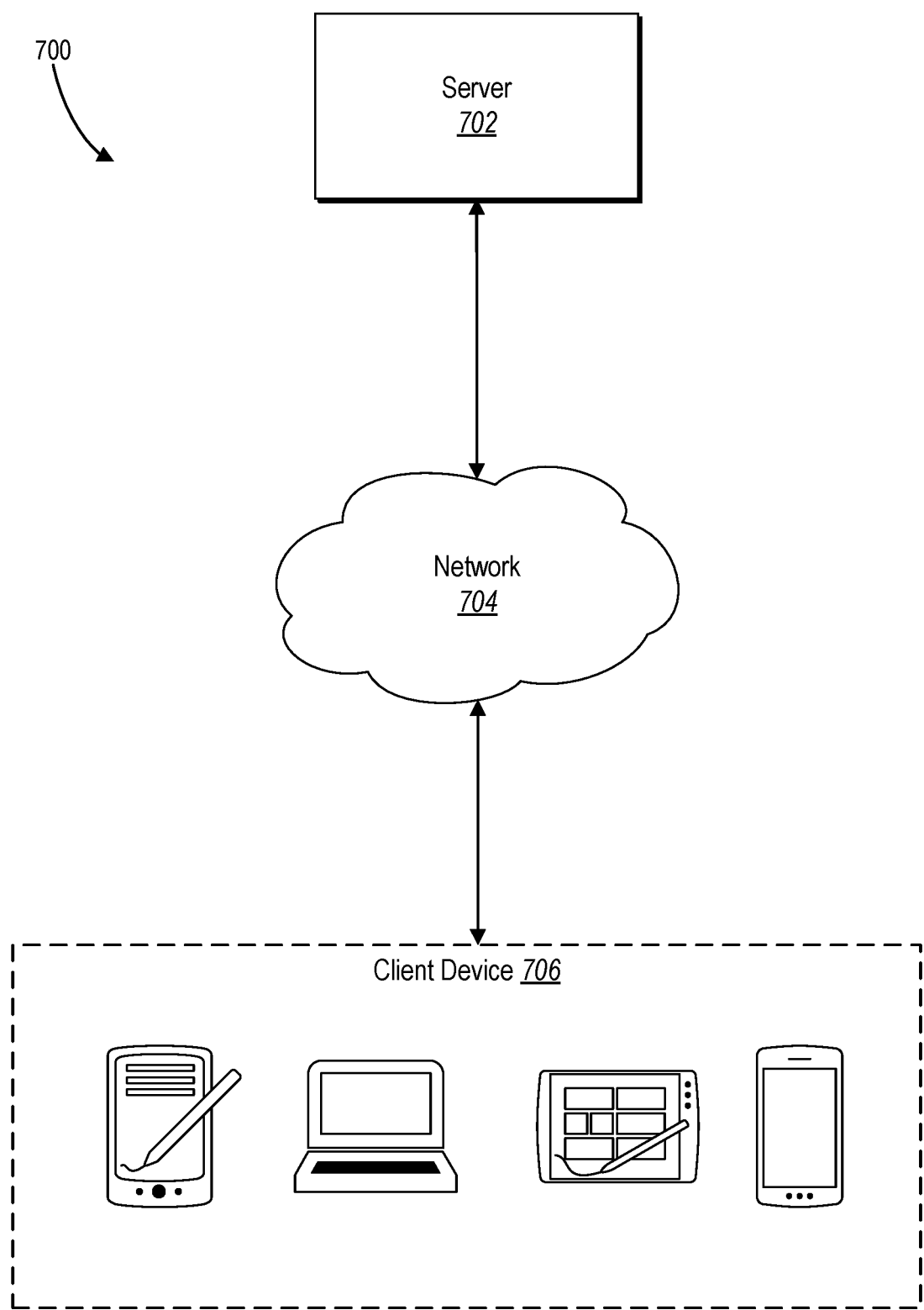
FIG. 7 is an example network environment in which the test management system can operate in accordance with one or more embodiments.

FIG. 7 illustrates an example network environment 700 of in which the test management system can operate. The network environment 700 includes a client device 706, and a server 702 connected to each other by a network 704. Although FIG. 7 illustrates a particular arrangement of the client device 706, the server 702, and the network 704, this disclosure contemplates any suitable arrangement of the client device 706, the server 702, and the network 704. As an example and not by way of limitation, the client device 706 and the server 702 may be connected to each other directly, bypassing network 704. As another example, the client device 706 and the server 702 may be physically or logically co-located with each other in whole or in part. Moreover, although FIG. 7 illustrates a particular number of client devices 706, servers 702, and networks 704, this disclosure contemplates any suitable number of client devices 706, servers 702, and networks 704. As an example and not by way of limitation, network environment 700 may include multiple client device 706, servers 702, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client device 706 and the server 702 to the communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 706. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 706 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 706 one or more Hyper Text Markup Language (HTML) files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 702 may be capable of linking a variety of entities. As an example and not by way of limitation, server 702 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 702. In particular embodiments, however, the server 702 and third-party systems may operate in conjunction with each other to provide analytics services to users of the server 702 or third-party systems. In this sense, server 702 may provide a platform, or backbone, which other systems, such as third-party systems, may use to provide analytic or data or tracking services and functionality to users across the Internet.

In particular embodiments, a third-party system may include a third-party content object provider. A third-party content object provider may include one or more sources of content objects, which may be communicated to a client device 706. As an example and not by way of limitation, content objects may include information regarding things or activities of interest to the user, such as, for example, digital media, digital designs, digital photographs, digital videos, digital audio, clip art, fonts, etc. As another example and not by way of limitation, content objects may include metadata that describes the content objects.

In particular embodiments, server 702 may include a variety of servers, sub-systems, programs, modules, logs, and data stores. In particular embodiments, server 702 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Server 702 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

What is claimed is:

1. In a digital medium environment for serving web pages over a network, a method of conducting A/B testing comprising:

receiving, at a web server and from a client-computing device, a first request for a web page;

identifying an A/B test mapping associated with the web page and comprising a range of mapping identifiers;

generating, by the web server, a token for the client-computing device by utilizing a visitor identifier associated with the web page to generate a hash output and identifying, as the token, a randomly selected sequential portion of the hash output matches one of the mapping identifiers within the A/B test mapping;

identifying, based on the generated token for the client-computing device, a first test version of a plurality of test versions of the requested web page;

providing the first test version of the requested web page and the generated token to the client-computing device;

receiving, at the web server and from the client-computing device, a second request for the web page, wherein the second request comprises the token;

identifying the first test version of the requested web page based on the token; and providing, to the client-computing device, the first test version of the requested web page.

2. The method as recited in claim 1, further comprising generating a mapping for an A/B test comprising:
   receiving A/B test parameters;
   generating, utilizing the received A/B test parameters, the A/B test mapping.

3. The method as recited in claim 2, wherein receiving A/B test parameters comprises receiving a listing of the plurality of test versions, and a desired distribution of web page traffic to each of the plurality of test versions.

4. The method as recited in claim 3, wherein generating the A/B test mapping comprises:
   generating the range of mapping identifiers; and
   associating each of the range of mapping identifiers to one of the plurality of test versions based on the desired distribution of web page traffic.

5. The method as recited in claim 3, wherein identifying the first test version of the plurality of test versions of the requested web page comprises:
   identifying, within the A/B test mapping, a mapping identifier from the range of mapping identifiers that matches the generated token; and
   identifying a test version from the plurality of test versions associated with the mapping identifier.

6. The method as recited in claim 1, wherein providing the first test version of the requested web page and the generated token to the client-computing device comprises generating a browser cookie based on the generated token.

7. The method as recited in claim 1, wherein identifying the first test version of the requested web page based on the token comprises:
   identifying, within the A/B test mapping, a mapping identifier that matches the generated token;
   identifying a personalization algorithm from a plurality of algorithms associated with the mapping identifier; and
   generating the first test version of the requested web page using the personalization algorithm.

8. The method as recited in claim 7, wherein generating the first test version of the requested web page using the personalization algorithm comprises selecting one or more products, advertisements, images, or videos to include in the first test version of the web page based on user information and one or more parameters specified in the personalization algorithm.

9. A non-transitory computer readable storage medium comprising instructions that, when executed by at least one processor, cause a computer system to conduct A/B testing by performing steps comprising:
   receiving, at a first web server, A/B test parameters that indicate an A/B test mapping of a range of mapping identifiers that are associated with one or more test versions of a first A/B tested web page or that allow the first web server to generate the mapping;
   receiving a first web page request from a client-computing device for the first A/B tested web page, wherein the first web page request is for the first A/B tested web page and comprises a token comprising a random number generated by creating a hash output based on a visitor identifier and then identifying, as the random number in the token, randomly selected sequential portion of the hash output that matches one of the mapping identifiers within the A/B test mapping;
   identifying, within the A/B test mapping and based on the token, one of the one or more test versions of the first A/B tested web page; and
   providing the identified test version of the first A/B tested web page to the client- computing device.

10. The non-transitory computer readable storage medium as recited in claim 9, wherein identifying one of the one or more test versions of the first A/B tested web page comprises:
    identifying a mapping identifier within the A/B test mapping corresponding to the token; and
    identifying a test version of the first A/B tested web page associated with the mapping identifier.

11. The non-transitory computer readable storage medium as recited in claim 10, wherein identifying a mapping identifier within the A/B test mapping corresponding to the token comprises identifying a mapping identifier within the A/B test mapping that matches the token.

12. The non-transitory computer readable storage medium as recited in claim 10, wherein identifying a mapping identifier within the A/B test mapping corresponding to the token comprises identifying the mapping identifier within the A/B test mapping that matches the randomly selected sequential portion of the hash output as the random number within the token.

13. The non-transitory computer readable storage medium as recited in claim 9, further comprising instructions that, when executed by the at least one processor, cause the computer system to:
    identify, prior to receiving the first web page request from the client-computing device, a plurality of additional web servers sharing a common network with the first web server; and
    distribute the A/B test mapping to the additional web servers;
    wherein receiving the first web page request is at one of the plurality of additional web servers.

14. The non-transitory computer readable storage medium as recited in claim 10, wherein identifying one of the one or more test versions of the first A/B tested web page further comprises:
    identifying a personalization algorithm based on the mapping identifier; and
    generating a test version of the first A/B tested web page using the personalization algorithm.

15. The non-transitory computer readable storage medium as recited in claim 9, further comprising instructions that, when executed by the at least one processor, cause the computer system to perform steps comprising:
    receiving a subsequent A/B test mapping for a second A/B tested web page;
    receiving a second web page request from the client-computing device for the second A/B tested web page, wherein the second web page request is for the second A/B tested web page and comprises the token comprising the randomly selected sequential portion of the hash output based on the visitor identifier associated with the first A/B tested web page and stored on the client-computing device;
    identifying, within the subsequent A/B test mapping and based on the token, a test version of the second A/B tested web page; and
    providing the identified test version of the second A/B tested web page to the client-computing device.

16. A system for conducting A/B testing comprising:
at least one processor; and
at least one non-transitory computer-readable storage medium storing instructions thereon that, when executed by the at least one processor, cause the system to:
- receive, from a client-computing device, a first request for a web page;
- identify an A/B test mapping associated with the web page and comprising a range of mapping identifiers;
- generate a token for the client-computing device by utilizing a non-geographically based visitor identifier associated with the web page to generate a hash output and identify, as the token a randomly selected sequential portion of the hash output matches one of the mapping identifiers within the A/B test mapping;
- identify, based on the generated token for the client computing device, a first test version of the requested web page;
- provide the first test version of the requested web page and the generated token to the client-computing device;
- receive, from the client-computing device, a second request for the web page, wherein the second request comprises the token;
- identify the first test version of the requested web page based on the token; and
- provide, to the client-computing device, the first test version of the requested web page.

17. The system as recited in claim 16, further storing instructions thereon that, when executed by the at least one processor, cause the system to:
- receive A/B test parameters, wherein the A/B test parameters comprise a listing of a plurality of algorithms, and a desired distribution of web page traffic to each of the plurality of algorithms; and
- generate, utilizing the received A/B test parameters, the A/B test mapping.

18. The system as recited in claim 17, wherein generating the A/B test mapping comprises:
- generating the range of mapping identifiers; and
- associating each of the range of mapping identifiers to one of the plurality of algorithms based on the desired distribution of web page traffic.

19. The system as recited in claim 18, wherein identifying the first test version of the requested web page comprises:
- identifying, within the A/B test mapping, a mapping identifier from the range of mapping identifiers that matches the generated token;
- identifying a personalization algorithm from the plurality of algorithms associated with the mapping identifier; and
- generating the first test version of the requested web page using the personalization algorithm.

20. The system as recited in claim 19, wherein generating the first test version of the requested web page using the personalization algorithm comprises selecting one or more products, advertisements, images, or videos to include in the first test version of the web page based on user information and one or more parameters specified in the personalization algorithm.

* * * * *